(12) United States Patent
Cragun

(10) Patent No.: US 6,686,937 B1
(45) Date of Patent: Feb. 3, 2004

(54) WIDGET ALIGNMENT CONTROL IN GRAPHICAL USER INTERFACE SYSTEMS

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 09/607,543

(22) Filed: Jun. 29, 2000

(51) Int. Cl.$^7$ ................................................ G09G 5/00
(52) U.S. Cl. ........................................ 345/804; 345/762
(58) Field of Search ................................. 345/804, 651, 345/677, 762, 763; 717/109

(56) References Cited

U.S. PATENT DOCUMENTS

| | | | | |
|---|---|---|---|---|
| 5,634,095 A | * | 5/1997 | Wang et al. | 345/763 |
| 5,796,401 A | * | 8/1998 | Winer | 345/619 |
| 6,288,732 B1 | * | 9/2001 | Moriwaki | 345/769 |
| 6,339,439 B1 | * | 1/2002 | Takahashi et al. | 345/853 |
| 6,421,072 B1 | * | 7/2002 | Ku et al. | 345/804 |

OTHER PUBLICATIONS

"Visual Languages and Visual Programming," WWW.Virtual Library: Visual Languages and Visual Programming—maintained on a purely voluntary basis by Bertrand Ibrahim, Visual Programming and Software engineering group, University of Geneva, recent update May 9, 2000.
"Optimizing Cut–and–Paste on Directed Graphs, with a User–Controlled Edge Reconstruction Strategy," http://cusung.unige.ch/papers/VL/98/poster,html, Jun. 2, 2000.
""3D–PP": Visual Programming System with Three–Dimensional Representation,", Takashoshiba, Doctoral Program in Engineering and Jiro Tanaka, Institute of Information of Sciences and Electronics, University of Tsukuba, Jun. 2, 2000.
"Visual Development Environment"—http://www.pdc.dk/viptechinfo/vde.htm, Jun. 2, 2000.
"Product Information," http://www.pdc.dk/viptechinfo/pdindex.htm, Jun. 2, 2000.
"About Visual Prolog"—http://www.pdc.dk/viptechinfo/about_visual_prolog.htm, Jun. 2, 2000.
"Code Experts"—http://www.pdc.dk/viptechinfo/code_experts.htm, Jun. 2, 2000.
"Integrated Editors for the Layout of Resources"—http://www.pdc.dk/viptechinfo/integrated_editors_for_the_prepa.htm, Jun. 2, 2000.
"Integrated Make Facility"—http://www.pdc.dk/viptechinfo/integrated_make_facility.htm, Jun. 2, 2000.
"High Level GUI Components"—http://www.pdc.dk/viptechinfo/high_level_gui_components.htm, Jun. 2, 2000.
"Project Tree Structure"—http://www.pdc.dk/viptechinfo/project_tree_structure.htm Jun. 2, 2000.
"Introduction to the Prolog Language"—http://www.pdc.dk/vipotechinfo/introduction.htm Jun. 2, 2000.

* cited by examiner

*Primary Examiner*—John Cabeca
*Assistant Examiner*—Blaine Basom
(74) *Attorney, Agent, or Firm*—Bracewell & Patterson, LLP; Roy W. Truelson

(57) ABSTRACT

A method within a graphical user interface (GUI) development environment for providing cross-pane visual display correlation between widgets that reside on different visual display panes. A GUI development tool is utilized to specify a visual display relation between an influenced widget and an influencing widget. The influencing widget is displayed within a first display pane and the influenced widget is displayed within a second display pane. The specified visual display relation is encoded within a GUI development description of the second display pane such that visual continuity between the influenced widget and the influencing widget is observed when an end user traverses from the first to the second display pane.

9 Claims, 4 Drawing Sheets

WIDGET ALIGNMENT CONTROL IN GRAPHICAL USER INTERFACE SYSTEMS

BACKGROUND OF THE INVENTION

1. Technical Field

The present invention relates in general to a graphical user interface (GUI) and, in particular, to a method and system for presenting a consistent visual presentation of widgets across different dialog pages. Still more particularly, the present invention relates to establishing graphical format inter-dependencies between widgets on different dialog pages such that visual continuity is maintained when an end user traverses through different dialog pages on which the widgets reside.

2. Description of the Related Art

Data processing systems utilize many different types of user interfaces. A common user interface for personal computer systems and personal digital assistants is a graphical user interface (GUI), that provides a user with a graphical and intuitive display of information. Typically, a user interacts with a GUI display utilizing a graphical pointing device, such as a mouse, track ball, glidepad, or stylus. Depending upon the actions allowed by the application or operating system software, the user can select a widget (i.e., a user-discernable feature of the graphical display such as an icon) by positioning the pointing device to make a selection.

Increasingly complex GUI environments include multiple display panes that are presented either simultaneously or sequentially to a user. Within such complex interactive environments, it is of great value to incorporate visual aids that enable a user to perceive and comprehend a maximum amount of visually presented information. Even subtle discontinuities or contrasts can significantly impair a user's mental processing of a simultaneous or sequential visual presentation. Discord in the visual presentation of widgets across multiple display panes within a GUI environment is a major source of disruption and confusion for users.

One approach for alleviating the problem of user confusion is to break up information into sub-panes having a finer incremental shift. Implementing this approach requires substantially greater numbers of visual display objects (additional display panes and associated widgets) and, thus, greatly increases model complexity as well as increasing the amount of overhead processing resources. In addition, this technique exacerbates the problem of inter-pane discontinuity by increasing the number of panes and widgets within a GUI.

An alternate approach is to enhance the organization and stylistics of and across each display pane. There are currently a variety of high-level GUI development tools for allowing designers to determine where and how baseline widgets are located within a given display pane, and to then estimate where corresponding widgets on other panes will be oriented with respect to the baseline widgets. This approach reduces the amount of operating time required by an end-user but still requires additional GUI development model complexity.

It can therefore be appreciated that a need exists for a GUI development tool for modifying widget design such that inter-pane influence can be utilized to provide an end-user with a consistent and organized cross-pane widget display.

SUMMARY OF THE INVENTION

A method within a graphical user interface (GUI) development environment for providing cross-pane visual display correlation between widgets that reside on different visual display panes is disclosed. A GUI development tool is utilized to specify a visual display relation between an influenced widget and an influencing widget. The influencing widget is displayed within a first display pane and the influenced widget is displayed within a second display pane. The specified visual display relation is encoded within a GUI development description of the second display pane such that visual continuity between the influenced widget and the influencing widget is observed when an end user traverses from the first to the second display pane.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

A well-designed GUI environment should minimize the discontinuity perceived by the user when traversing across multiple display panes such as dialog or Web pages. The present invention provides a method for developing a GUI environment in which the goals of user-friendliness and model simplicity are simultaneously achieved.

Figure 1:
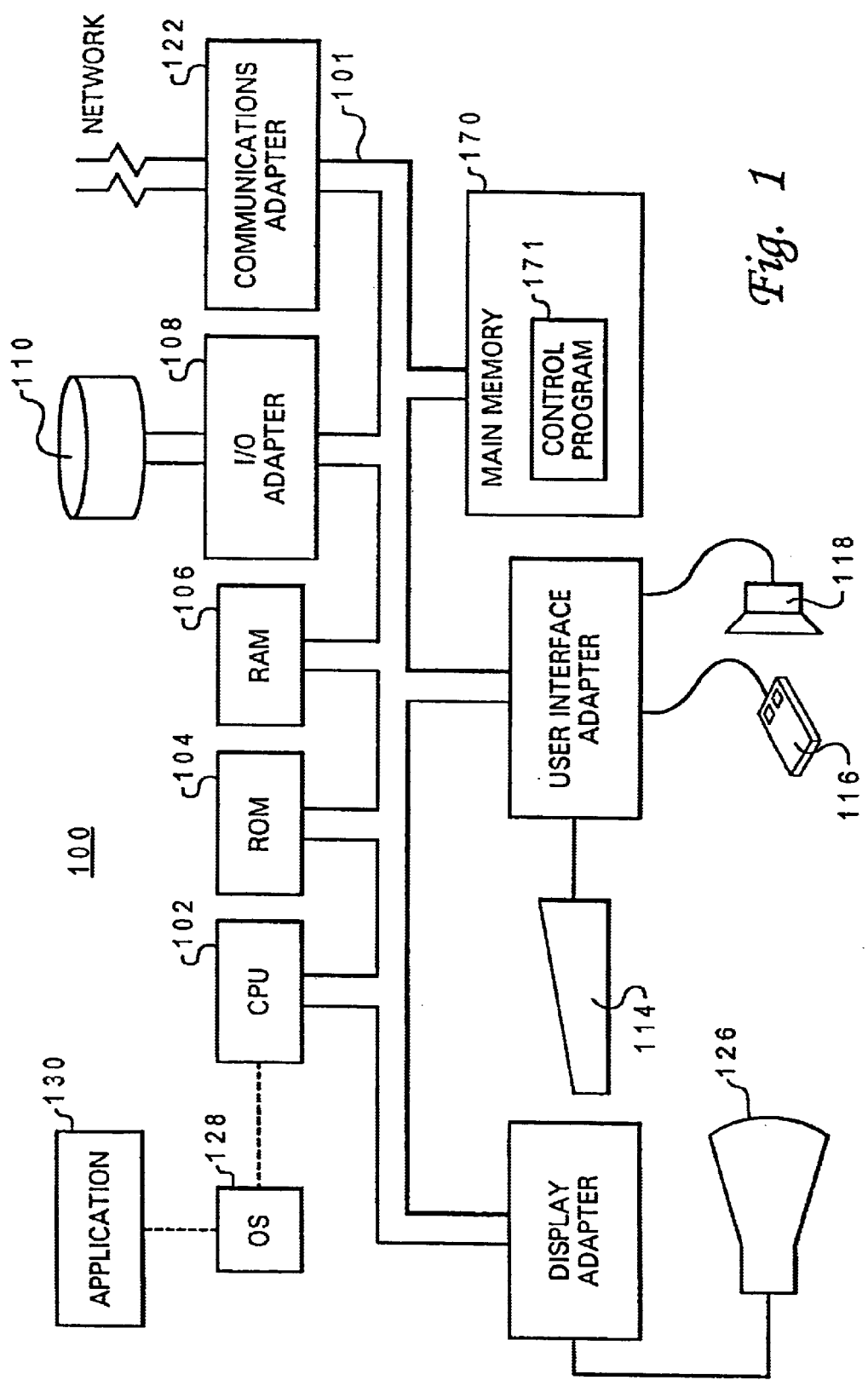
FIG. 1 is a block diagram of a data processing system for implementing an integrated development environment (IDE) according to a preferred embodiment of the present invention.

With reference now to the figures wherein like reference numerals refer to like and corresponding parts throughout, and in particular with reference to FIG. 1, there is illustrated a data processing system 100 in which a preferred embodiment of the present invention may be implemented. A central processing unit (CPU) 102, such as one of the processors available from International Business Machines Corporation (IBM), is provided and interconnected to various other components by system bus 101. An operating system 128 runs on CPU 102 and provides coordination and control among the various components of data processing system 100. A program application 130 operates in conjunction with operating system 128, and provides output calls to operating system 128 which implement the various functions to be performed by application 130.

A read only memory (ROM) 104 is connected to CPU 102 via bus 101 and includes the basic input/output system (BIOS) that controls basic computer functions. A random access memory (RAM) 106, I/O adapter 108 and communications adapter 122 are also interconnected to system bus 101. It should be noted that software components, such as operating system 128 and application 130, are loaded into RAM 106, which operates as the main memory for data processing system 100. I/O adapter 108 may be a small computer system interface (SCSI) adapter that communicates with a disk storage device 110.

Communications adapter 122 interconnects bus 101 with an external network, enabling data processing system 100 to communicate with other such systems over a local area network (LAN) or wide area network (WAN), such as the Internet. By utilizing the aforementioned I/O devices, a user is capable of inputting information to data processing system 100 through input devices such as a keyboard 114, a mouse 116, and receiving output information from the system from a speaker 118 or a visual display screen 126.

As further illustrated in FIG. 1, a main memory 170 is connected to system bus 101, and includes a control program 171. Control program 171 resides within main memory 170 and contains instructions that when executed on CPU 102 carry out the operations depicted in the high-level flow diagram of FIGS. 3 described herein. The computer program product also can be referred to as a program product. Control program 171 can support a number of interactive graphics tools including, for example, integrated development environments (IDEs), and other software development packages. Among known GUI development software applications are Visual Basic®, Visual C++®, Visual Prolog®, and the like.

It is important to note that, while the present invention is described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links.

Communications adapter 122 may be a network card (not depicted) that can be connected to system bus 101 in order to link data processing system 100 to other data-processing system networks in a client/server architecture or to groups of computers and associated devices which are connected by communications facilities. Those skilled in the art will appreciate that the hardware depicted in FIG. 1 may vary for specific applications. For example, other peripheral devices, such as: optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

A widget is a graphic device that can receive and respond to input from a user input device and communicate with another application (possibly another widget) by means of a callback. In many operating systems such as IBM's AIX operating system, every widget is a member of only one class wherein it implements procedures, such as communicated via a callback, through its widget class structure. A widget class designates the general group to which a specific widget belongs and serves as a pointer from the widget to other data structures.

Figure 2:
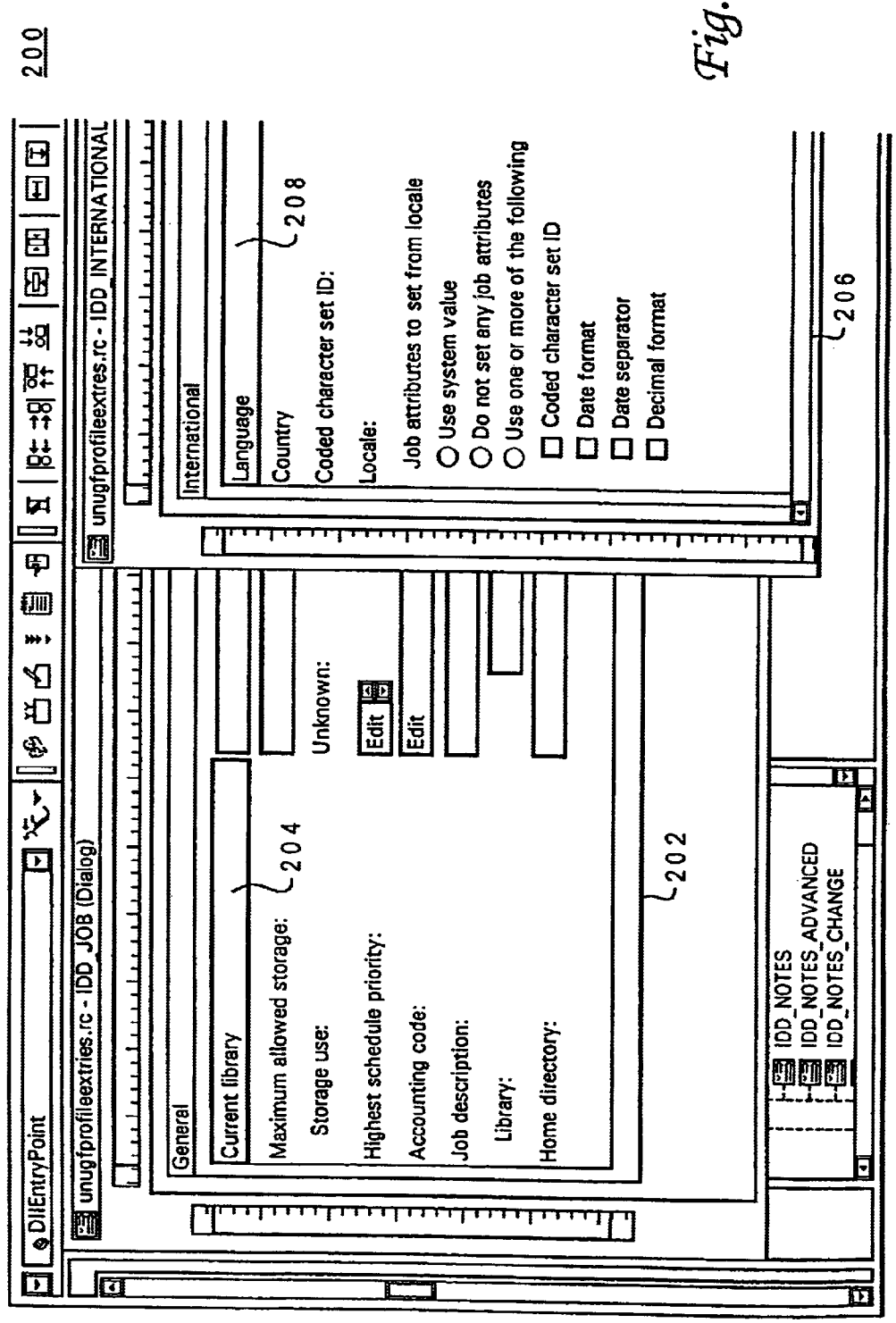
FIG. 2 illustrates a graphical user environment for implementing cross-pane widget alignment in accordance with a preferred embodiment of the present invention.

With reference now to FIG. 2 there is illustrated a GUI environment 200 incorporating cross-pane widget alignment in accordance with a preferred embodiment of the present invention. GUI environment 200 includes several display panes which, as explained in further detail with reference to FIG. 3, may be utilized for developing other GUI environments. Specifically, a first display pane 202 includes several user discernable features known in the art as widgets. As further illustrated in FIG. 2, first display pane 202, an influencing widget 204 has been selected as indicated by its bolded contour.

Related to influencing widget 204 is an influenced widget 208 within a second display pane 206. In accordance with the teachings of the present invention, the development model of first display pane 202 and second display pane 206 includes a pointer by which visual display characteristics of influencing widget 204 such as alignment, size, color, etc., can be implemented to provide automatic visual display adjustments for influenced widget 208. In accordance with a preferred embodiment of the present invention, dedicated command buttons (widgets) may be utilized within GUI environment 200 for selecting influencing widget 204, influenced widget 208, and the display attribute with which their visual displays will be correlated.

In response to user selection, a number of factors affect the relative visual display characteristics of widgets within GUI environment 200. Included among such factors are the type of widget that was selected and the order of the selection in the current interaction scenario (selecting second display pane 206 subsequent to selecting first display pane 202, for example). As another example, if a user selects an iconic widget or a display pane with a single "click" by the pointing device, the user can typically relocate the icon within GUI environment 200 utilizing the well-known drag-and-drop technique. Alternatively, if the selected widget is a menu bar choice, a pull-down menu is typically displayed, permitting the user to make a single selection from among the choices listed in the pull-down menu. Given the wide variety of possible visual configurations among the widgets within GUI environment 200, the present invention enhances end-user and developmental efficiency by providing widget continuity between different display panes.

Figure 3:
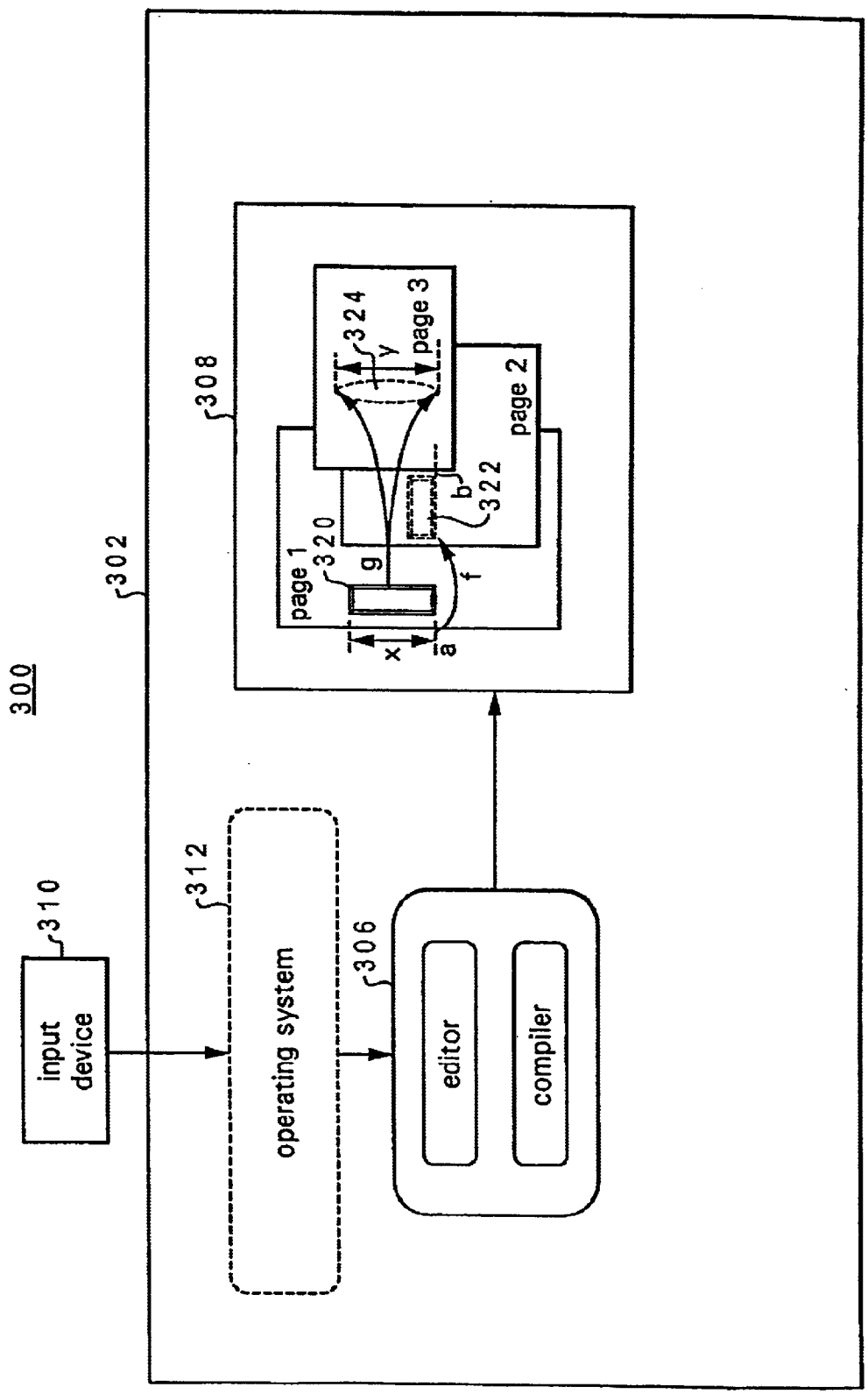
FIG. 3 is a block diagram of an integrated design environment in accordance with a preferred embodiment of the present invention.

FIG. 3 is a block diagram representation of an integrated design environment (IDE) 300 in accordance with a preferred embodiment of the present invention. As illustrated in FIG. 3, IDE 300 is implemented within the context of a data processing system 302 into which a GUI builder 306 has been installed. IDE includes an input device 310 by which a user can operate a data processing system 302. Typical of high-level GUI development environments, IDE 300 includes a GUI builder 306 that consists of an editor and compiler. GUI builder 306 is a software application constructed using a symbolic language such as C++ or Java.

An operating system 312 loads and executes GUI builder 306 in accordance with input from input device 310. As further illustrated in FIG. 3, a GUI model 308 is constructed by GUI builder 306. GUI model 308 includes three dialog pages (analogous to display panes 202 and 206). Associated with each dialog page is one or more widgets comprising a widget class. Widgets within GUI model 308 are designed such that they are displayed to end-users as collections of selected picture elements (pels) within a computer display device. The visual presentment of widgets is indicative of their association with a window or "dialog page."

As further depicted in FIG. 3, the widget class of page 1 includes an influencing widget 320 which includes a lowermost vertical picture element (pel) boundary a, and a vertical pel boundary height x as two of its visual display characteristics. In an important feature of the present invention, GUI builder 306 is utilized to incorporate a visual display relation, f, between an influenced widget 322 and an influencing widget 320 such that pel boundary b is aligned with pel boundary a. As utilized herein "influencing widget" is defined as a baseline widget to which other widgets will be correlated. An "influenced widget" is defined as a widget having an encoded display relation to at least one influencing widget. Display relation f is encoded by GUI builder 306 into the description of widget 322. In some instances it may be advantageous to encode a display relation such as f with respect to a relative visual feature such as the upper left corner of page 2.

Similarly, a visual display relation, g, is specified to correlate a vertical pel height, y, of a widget 324 residing within page 3 with the vertical pel height x of widget 320 within page 1.

From a user perspective, each of the widgets designed by GUI builder 306 and rendered on a graphics display includes varying visual display characteristics such as size, position, color, relative orientation on the display device, etc. These, and other visual characteristics are relevant in determining an optimal operating environment for an end-user. It should be noted that the inventive concept disclosed herein is based on the aggregate effect of such visual display characteristics, and is thus independent of any one or more of the specific above-mentioned visual display characteristics.

After development, widgets are implemented within display environments as interface devices that can receive and respond to user input and that utilize callbacks to communicate with various other applications such as the operating system, another widget, etc. Whereas widgets have global operativeness, the visual characterization of widgets has traditionally been determined in accordance with the context of the particular display pane in which they reside. Unlike conventional GUI development environments which may include intra-pane widget correlation, the embodiment depicted in FIGS. 3 and 4 includes the capability of providing inter-pane widget display correlation.

Figure 4:
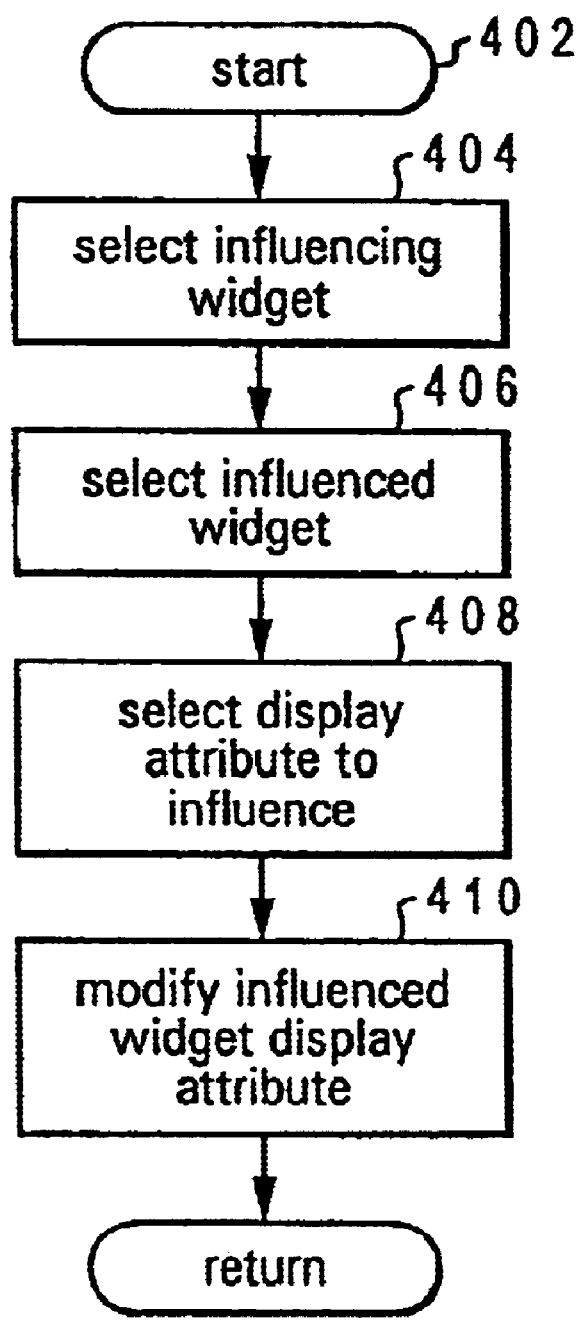
FIG. 4 is a flow diagram depicting steps performed during widget development, in accordance with a preferred embodiment of the present invention.

Referring now to FIG. 4 there is illustrated a flow diagram depicting steps performed during widget development within IDE 300 in accordance with a preferred embodiment of the present invention. The development process begins as shown at step 402 and proceeds to step 404 which illustrates selection of influencing widget 320. This selection may be performed by user selection of a designated command button within GUI builder 306. The selection of influencing widget 320 is performed by providing an input command via input device 310 which is then executed within the context of operating system 312. Next, as depicted at step 406 influenced widget 322 or 324 is selected utilizing the same means within IDE 300.

Following the selection of the both influencing widget 320 and influenced widget 322 or 324, the user selects a display attribute as depicted at step 408. The display attribute selected at step 408 may be any visual characterization perceptible on an output display device. Examples of such visual characterizations include, but are not limited to, picture element size, relative position within a picture element array, color, and orientation. Next, step 410 illustrates modification of the selected display attribute within the description of influenced widget 322 or 324. In a preferred embodiment, such modification can be performed by encoding the display relation between influencing widget 320 and influenced widget 322 or 324 within the description of widget 322 or 324 as edited and compiled by GUI builder 306.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described within reference to the figures can be accomplished with a computer-aided device. In such a method, data stored in a memory unit of a data-processing system such as a data-processing system, can represent steps in a method for implementing a preferred embodiment of the present invention.

While the invention has been particularly shown and described with reference to a preferred embodiment, it will be understood by those skilled in the art that various changes in form and detail may be made therein without departing from the spirit and scope of the invention.

What is claimed is:

1. A method within a graphical user interface (GUI) development environment for providing cross-pane visual display correlation between widgets that reside on different visual display panes, said method comprising the steps of:

specifying a visual display relation between an influenced widget and an influencing widget, said specifying step being performed as part of a process of developing a graphical user interface for an end user application, said graphical user interface including a plurality of display panes for presenting information to an end user of said end user application, wherein said influencing widget is displayed within a first display pane of said graphical user interface and said influenced widget is displayed within a second display pane of said graphical user interface, said visual display relation between said influenced widget and said influencing widget being independent of any relation between said first display pane and said second display pane;

encoding said specified visual display relation within a GUI development description of said second display pane;

defining a visual display characterization for said influencing widget within said first display pane; and determining a visual display characterization for said influenced widget within said second display pane as a function of said defined visual display characterization of said influencing widget, wherein said function includes said specified visual display relation, such that visual continuity between said influenced widget and said influencing widget is observed as said end user traverses from said first to said second display pane.

2. The method of claim 1, wherein said defining step further comprises specifying a picture element description for said influencing widget.

3. The method of claim 2, wherein said picture element description may be characterized among a group including size, location, color, and orientation.

4. The method of claim 2, further comprising the steps of:
specifying a relative picture element description for said influenced widget within said second display pane as a function of said specified picture element description for said influencing widget, wherein said function includes said specified visual display relation; and
positioning said influenced widget within said second display pane according to said specified relative picture element description within said second display pane, such that said influencing widget picture element description is utilized for guiding cross-pane widget alignment.

5. A program product for developing GUI applications, said program product comprising a plurality of computer executable instructions recorded on computer readable media, wherein said instructions, when executed by a computer, perform the steps of:
specifying a visual display relation between an influenced widget and an influencing widget, said specifying step being performed as part of a process of developing a graphical user interface for an end user application, said graphical user interface including a plurality of display panes for presenting information to an end user of said end user application, wherein said influencing widget is displayed within a first display pane of said graphical user interface and said influenced widget is displayed within a second display pane of said graphical user interface, said visual display relation between said influenced widget and said influencing widget being independent of any relation between said first display pane and said second display pane;
encoding said specified visual display relation within a GUI development description of said second display pane;
defining a visual display characterization for said influencing widget within said first display pane; and
determining a visual display characterization for said influenced widget within said second display pane as a function of said defined visual display characterization of said influencing widget, wherein said function includes said specified visual display relation, such that visual continuity between said influenced widget and said influencing widget is observed as said end user traverses from said first to said second display pane.

6. The program product of claim 5, wherein said step of defining a visual display characterization for said influencing widget further comprises specifying a picture element description for said influencing widget.

7. The program product of claim 6, wherein said picture element description may be characterized among a group including size, location, color, and orientation.

8. The program product of claim 6, wherein said program product further performs the steps of:
specifying a relative picture element description for said influenced widget within said second display pane as a function of said specified picture element description for said influencing widget, wherein said function includes said specified visual display relation; and
positioning said influenced widget within said second display pane according to said specified relative picture element description within said second display pane, such that said influencing widget picture element description is utilized for guiding cross-pane widget alignment.

9. A graphical user interface development system for providing cross-dialog correlation of the graphical orientations of a plurality of widgets that reside on separate dialog pages, said graphical user interface development system comprising:
a cross-dialog pointer for specifying a visual display relation between an influenced widget and an influencing widget, wherein said influencing widget is displayed within a first display pane of a plurality of display panes in a graphical user interface for an end user application developed using said graphical user interface development system, said plurality of display panes for presenting information to an end user of said end user application, and said influenced widget is displayed within a second display pane of said plurality of display panes in said graphical user interface, said visual display relation between said influenced widget and said influencing widget being independent of any relation between said first display pane and said second display pane; and
processing means for encoding said specified visual display relation within a GUI development description of said second display pane;
wherein a visual display characterization of said influenced widget within said second display pane is determined as a function of a visual display characterization of said influencing widget, said function including said specified visual display relation, such that visual continuity between said influenced widget and said influencing widget is observed as said end user traverses from said first to said second display pane.

* * * * *